United States Patent [19]
Chlanda et al.

[11] Patent Number: 4,766,161
[45] Date of Patent: Aug. 23, 1988

[54] BIPOLAR MEMBRANES AND METHODS OF MAKING SAME

[75] Inventors: Frederick P. Chlanda, Rockaway; Ming J. Lan, Parsippany, both of N.J.

[73] Assignee: Allied Corporation, Morris Township, Morris County, N.J.

[21] Appl. No.: 871,184

[22] Filed: Jun. 5, 1986

[51] Int. Cl.$^4$ .............................................. B32B 27/30
[52] U.S. Cl. .................... 521/27; 204/196; 428/522
[58] Field of Search .................... 521/27; 204/196; 428/522

[56] References Cited

U.S. PATENT DOCUMENTS

| | | | |
|---|---|---|---|
| 2,829,095 | 4/1958 | Oda | 204/48 |
| 3,372,101 | 3/1968 | Kollsman | 204/180 |
| 3,388,080 | 6/1968 | Korosy | 260/2.2 |
| 3,654,125 | 4/1972 | Leitz | 204/301 |
| 4,024,043 | 5/1977 | Dege | 204/296 |
| 4,057,481 | 11/1977 | Lee | 204/296 |
| 4,116,889 | 9/1978 | Chlanda | 521/27 |
| 4,140,815 | 2/1979 | Dege | 427/44 |
| 4,225,412 | 9/1980 | Reiss | 521/27 |
| 4,253,900 | 3/1981 | Dege | 521/27 |
| 4,355,116 | 10/1982 | Lee | 521/27 |
| 4,584,246 | 4/1986 | Liu | 521/27 |

FOREIGN PATENT DOCUMENTS

0143582 6/1985 European Pat. Off.
1038777 10/1986 United Kingdom.

OTHER PUBLICATIONS

Simons, Electric Field Effects on Proton Transfer Between Ionizable Tropic and Water in Ion Exchange Membranes, Electrachimica. vol. 29, No. 2 pp. 151-158, Pergamon Press (1981).

*Primary Examiner*—C. Warren Ivy
*Attorney, Agent, or Firm*—Richard A. Negin; Gerhard H. Fuchs

[57] ABSTRACT

Bipolar membranes are disclosed which exhibit high permselectivity, good mechanical strength, ability to operate at high current density, low potential drop and long-term stability. Essential to the production of bipolar membranes with these properties is the construction of the interface layer, which includes a matrix material containing quaternary and non-quaternary amine groups and having dispersed therein a cation exchange resin. A number of additional important characteristics are disclosed directed to the construction of the anion and cation layers of the bipolar membranes. A preferred method for forming bipolar membranes by casting layers on top of one another is also disclosed.

16 Claims, 1 Drawing Sheet

BIPOLAR MEMBRANES AND METHODS OF MAKING SAME

FIELD OF THE INVENTION

The present invention is directed to bipolar membranes which are particularly useful in electrodialytic water splitting processes.

BACKGROUND OF THE INVENTION

Bipolar membranes are known to be useful for their ability to rectify alternating current, to improve desalination processes, to act as analogs of certain biological membranes, and to split water in the electrodialysis of acids and bases from salts. This latter property has great usefullness, since a wide range of soluble salts can be processed into commercially useful acids and bases by electrodialysis equipment employing bipolar membranes.

Bipolar membranes prepared by various procedures have been reported in the literature. For example, bipolar membranes have been prepared by adhering together, with heat and pressure or with an adhesive paste, two membranes consisting of oppositely charged ion exchange resins in an inert matrix (see U.S. Pat. No. 2,829,095). Anion and cation exchange membranes have also been fused together by means of heat and pressure to form bipolar membranes as disclosed in U.S. Pat. No. 3,372,101 and U.K. No. 1,038,777. The application of an anionic polyelectrolyte paste to a cation membrane which is then cured to yield a bipolar membrane has been described. Further, the preparations of bipolar membranes from a single sheet of polymeric material which is selectively functionalized on one side to give cation selectivity and on the other side to give anion selectivity has been disclosed in U.S. Pat. Nos. 3,388,080 and 3,654,125 and, more recently, U.S. Pat. Nos. 4,024,043, 4,057,481 and 4,140,815.

U.S. Pat. No. 4,116,889 describes bipolar membranes which exhibit good mechanical strength, ability to operate at high current density, high permselectivity, low potential drop and stable properties. As disclosed, a critical factor in the production of bipolar membranes exhibiting low potential drop is the degree of intimate contact between the anion and cation layers. The degree of contact must be controlled such that the layers do not interpenetrate each other to a degree which would result in a high resistance layer between the cation and anion permselective portions of the membrane. The bipolar membranes produced by the disclosed process have ion exchange resins dispersed in a polymer matrix having ionic groups of charge opposite the charge of ion exchange resin. The use of a polymer matrix containing crosslinked material (ion exchange resin) limits the degree of interpenetration to the extent necessary to produce quality bipolar membranes. An alternative process for producing bipolar membranes having an interfacial layer of ion exchange resin in a matrix polymer having ionic groups of charge opposite the charge of the ion exchange resin has been disclosed in EPA No 0,143,582. Not withstanding the disclosure of U.S. Pat. No. 4,116,889, the multitude of additional factors which contribute to improved stability, permselectivity and potential drop of dipolar membranes have not been heretofore uncovered.

SUMMARY OF THE INVENTION

Figure 1:
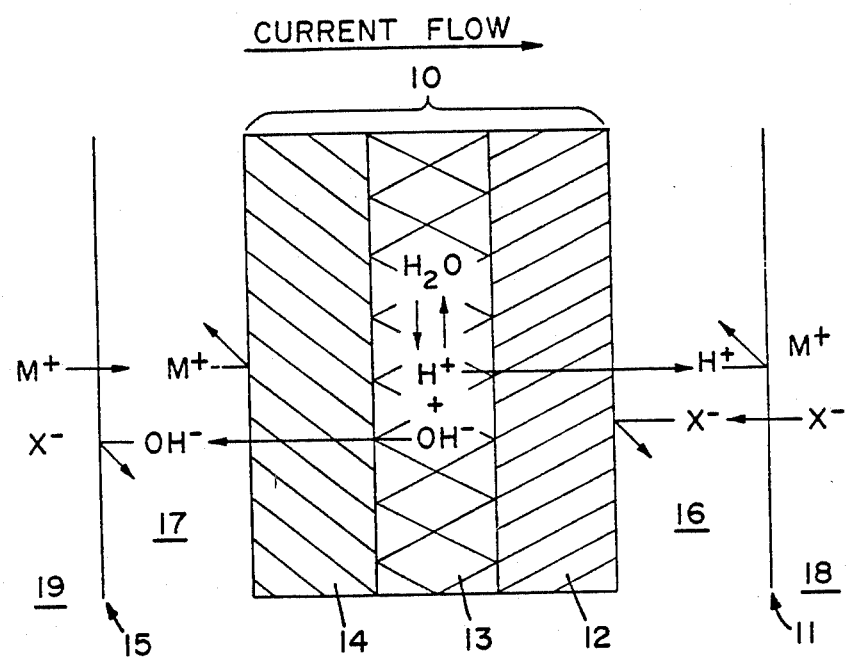
FIG. 1 Illustrates schematically and in a magnified scale an arrangement by which a bipolar membrane prepared in accordance with the invention may be used to generate acid and base.

We have discovered a multitude of characteristics which are important in the production of high stability, high permselectivity and low potential drop bipolar membranes.

Accordingly, bipolar membranes of the present invention comprise an anion permselective portion, a cation permselective portion and an interfacial layer arranged therebetween comprising a matrix polymer having dispersed therein a cation exchange resin, also containing quaternary and non-quaternary amine groups, the bipolar membrane having a voltage drop of less than 1.2 volts at 109 ma/cm$^2$ in 0.5 M Na$_2$SO$_4$ at about 30° C.

Improved bipolar membranes also comprise an anion permselective portion, a cation permselective portion and a region therebetween, the region comprises a matrix material comprising the reaction product of a polymer containing between about 1.2 meq/g and about 3.9 meq/g benzyl halide and amine, which reaction product including quaternary amine groups derived from halomethyl groups of the polymer, and an ion exchange resin having a charge opposite the charge of the quaternary amine groups.

Bipolar membranes of the present invention are also characterized by an anion permselective layer comprising a crosslinked reaction product of poly(styrene-vinyl benzyl halide) copolymer containing between about 18 wt % and about 60 wt % vinylbenzyl halide and amine, the crosslinked reaction product comprising quaternary amine groups, and being essentially free of cation exchange resin; an interfacial layer comprising (i) the crosslinked reaction product of poly(styrene-vinylbenzyl halide) copolymer containing between about 30 wt. % and about 60 wt. % vinylbenzyl halide and diamine, and (ii) cation exchange resin dispersed in the crosslinked reaction product; and, a cation permselective layer being essentially free of amine groups.

The invention is also directed to bipolar membranes comprising an anion permselective layer having an ion exchange capacity of between about 1 meq/g and about 2 meq/g and containing quaternary amine groups, an interface layer having an ion exchange capacity of between about 1 meq/g and about 3 meq/g for Na$^+$ and containing quaternary amine groups and weakly basic ion exchange groups, and a cation permselective layer having an ion exchange capacity of between about 1 meq/g and about 1.6 meq/g.

Bipolar membranes in accordance with the present invention are further characterized by an anion permselective layer having an anion exchange capacity of between about 1 meq/g and about 2 meq/g, an interfacial layer comprising a matrix material and an ion exchange resin and having an ion exchange capacity for Na$^+$ between about 1 meq/g and about 3 meq/g and an ion exchange capacity for Cl$^-$ of between about 1 meq/g and about 3 meq/g, and a cation permselective layer having an ion exchange capacity between about 1.3 meq/g and about 1.6 meq/g.

The invention is also directed to a novel method for making bipolar membranes which comprises the steps of forming a first layer of a polymer having chemically reactive sites, the polymer having amine groups affixed thereto by the reaction of the polymer with mixed amines comprising N,N-dimethyl-1,3-propanediamine and N,N,N',N'-tetramethyl-1,6-hexanediamine in a molar ratio between about 1:2 and about 5:1, forming on the first layer a second layer comprising a polymer which reacts with said mixed amines to form quaternary amine groups and a cation exchange resin dispersed in the polymer of the second layer, and forming a third layer on the second layer, the third layer being a cation permselective layer.

DETAILED DESCRIPTION OF THE INVENTION

The fundamental concept by which a bipolar membrane may be used to produce acid and base can be understood by reference to FIG. 1 in which a greatly magnified portion of a bipolar membrane 10, not drawn to scale, is shown schematically. The bipolar membrane 20 consists of three portions, a cation selective portion, 12, an anion selective portion, 14, an the interface region, 13, between the anion and cation portions. When a direct current is passed across the bipolar membranes as shown, the transport of ions between solutions 16 and 17 is interrupted since anions are excluded from the cation side 12 and cations are excluded from the anion side 14. Since little or no salt is present in the interface region 13, the dissoction of water to $H^+$ and $OH^-$ provides the ions for carrying the current across the membrane. Water at the interface is replaced by diffusion through the anion, portion 14 and cation portion 12, from the solutions 17 and 16. When used in conjunction with monopolar membranes (one arrangement of which is shown in FIG. 1) the bipolar membrane functions to produce the ions needed to generate acid and base from salt MX. If membrane 11 is an anion permeable membrane, then as $H^+$ enters solution 16 from the bipolar membrane, 10, an equivalent amount of $X^-$ will enter solution 16 from compartment 18 producing a solution of HX in solution 16. Similarly, if membrane 15 is a cation membrane, then as $OH^-$ enters solution 17 from the bipolar membrane 10, $M^+$ will enter solution 17 from compartment 19 to form a solution of MOH.

While the principle by which bipolar membranes produce $H^+$ and $OH^-$ is known, high quality membranes to carry out this process efficiently have been difficult to fabricate. The electrical potential required to generate acid and base by means of a bipolar membrane, as given by electrochemical theory, should be on the order of 0.8 volts to produce 1N solutions of strong acid and base. Some additional potential is also required to overcome the resistance to transport of $H^+$ and $OH^-$ through the cation and anion portion of the membrane, respectively. Consequently, the production of bipolar membranes exhibiting a potential drop of less than 1.2 volts in 0.5 M $Na_2SO_4$ at about 30° C. and at high current densities (e.g. 100 A/ft$^2$) (109 mA/cm$^2$) has not been heretofor reported.

A primary requirement for producing bipolar membranes of low potential drop is the creation of an interfacial region which does not exhibit a high resistance layer. The interfacial region is between the anion and cation portion of the membrane. As stated above, U.S. Pat. No. 4,116,889 disclosed bipolar membranes with an interfacial layer comprising ion exchange resin dispersed in a polymer matrix having ionic groups of charge opposite the charge of the ion exchange resin. However, until now the form of the ionic groups employed in the interfacial region was not recognized as being critical to the production of bipolar membranes. More specifically, the ionic groups in the interfacial layer must comprise quaternary amines. The inclusion of quaternary amines in the interfacial region is critical to the production of low potential drop bipolar membranes. Sufficient anion exchange capacity in the interfacial region in conjunction with cation resin particles in the interface yields a low resistance, highly efficient water splitting region. In addition, we have discovered, unexpectedly, that it is also critical to have weakly basic (non-quaternary amine) groups in the interfacial layer. The weakly basic groups act to catalyze the dissociation of water into $H^+$ and $OH^-$. The combination of strongly basic (quaternary amine) groups and weakly basic (non-quaternary amine) groups yields membranes with significantly lower potential drops than have been reported heretofor.

In addition to quaternary and non-quaternary amine groups in the polymer matrix of the interface region, the composition of the matrix also influences the potential drop. We have discovered that benzyl halide containing polymers employed to form the matrix material can have a significant effect on the potential drop of the membrane. More specifically, we have discovered that the benzyl halide should be present in the polymer used to form the matrix material in an amount ranging from about 2.0 meq/g to about 3.9 meq/g. The optimum range of the benzyl halide is about between 2.0 meq/g and about 3.15 meq/g.

We have also discovered that providing the benzylhalide as a vinylbenzyl halide-containing polymer is particularly effective in the production of bipolar membranes. More particularly, we have discovered that vinylbenzyl halide should be present in the polymer used to form the matrix in an amount ranging from about 30 wt. % and about 60 wt. %, with the optimum range being from about 30 wt. % to about 48 wt. %. The most preferred form of vinylbenzyl halide is vinylbenzyl chloride.

The vinylbenzyl halide is most preferably provided as a copolymer which also includes a polymer selected from the group of acrylates, styrene, divinyl benzene, butadiene and isoprene. Copolymers formed from these monomers produce bipolar membranes with the lowest potential drops. Most preferably, the copolymer, in addition to vinylbenzyl halide, contains divinylbenzene or styrene. However, mixtures of the above mentioned monomers may also be employed in conjunction with the vinylbenzyl halide without departing from the scope of the present invention.

Dispersed in the matrix material is a cation exchange resin. The cation exchange resin preferably has an extremely small particle size (on the order of 300 Å) The small particle size aids in the production of an interface layer having a generally homogeneous dispersion of resin in the matrix. The resin most preferably employed exhibits an ion exchange capacity of between about 3 meq/g and about 5 meq/g. To produce quality bipolar membranes of the type described herein, the weight ratio of copolymer to resin is between about 1:2 and about 2:1, with about 0.7:1 to about 1.5:1 being the most preferred ratio.

The cation exchange resin comprises divinyl benzene, with the most preferred resin being a hydrolyzed product of chlorosulfonated styrene and divinyl benzene. The amount of divinyl benzene in the resin is important in the production of resins having the required ion exchange capacity. Accordingly, the resins useful in the present invention include divinyl benzene in an amount of at least about 30 wt. %.

The interfacial region defined by the construction described hereinabove exhibits an ion exchange capacity for cations and anions. For membranes of the preferred construction, the ion exchange capacity is between about 1 meq/g and about 3 meq/g for both Na+ and Cl−. Moreover, weak base ion exchange capacity (i.e., capacity for HCl) for weak base is between about 0.5 meq/g and about 2 meq/g.

The bipolar membrane of the present invention comprises an anion exchange layer which is a layer of low resistance and high permselectivity. The matrix material is, most preferably, a crosslinked reaction product of a benzyl halide-containing polymer and an amine. The polyelectrolyte in the layer contains quaternary amine groups derived from halomethyl groups of the polymer used to form the matrix of the layer.

The amount of benzyl halide in the anion layer of the membrane must be controlled to ensure that after reacting with the amine, the resultant charge density is high enough to produce an effective anion permselective layer but not so high as to cause the membrane to swell excessively. High swelling reduces mechanical strength and reduces permselectivity of the resulting membrane. Accordingly, the benzyl halide present in the polymer used to form the matrix material is at least about 1.2 meq/g but not more than about 3.9 meq/g. Most preferably, the benzyl halide is present in the polymer in the amount between 2 meq/g and about 3 meq/g, with the most preferred form of benzyl halide being benzyl chloride.

The benzyl halide containing polymer is most preferably a vinylbenzyl halide-containing polymer. The vinylbenzyl halide is present in the polymer in an amount between about 18 wt. % and about 60 wt. % and, most preferably, is present in an amount between about 20 wt. % and about 45 wt. %.

The preferred polymer used to form the anion layer is most preferably a copolymer containing vinylbenzyl halide. Most preferably, the polymer is a styrene-vinylbenzyl chloride copolymer. However, the copolymer may contain, in place of styrene, monomers such as butadiene, isoprene or α-methyl styrene.

The anion exchange layer of the membrane exhibits an strong base ion exchange capacity of between about 1 meq/g and about 2 meq/g. Moreover, the anion exchange layer generally has a thickness of between about 2 mil (0.051 mm) and about 10 mil (0.254mm).

Bipolar membranes also comprise a cation exchange layer. We have also discovered that excellent bipolar membranes are produced when the cation exchange layer exhibis an exchange capacity of about between 1.0 meq/g and about 1.6 meq/g, and more particularly when the ion exchange capacity is between about 1.3 meq/g and 1.6 meq/g. While the cation exchange layer may be formed from the material disclosed in U.S. Pat. No. 4,116,889, the most preferred cation exchange layer comprises polystyrene, at least a portion of which is sulfonated, and between about 10 wt. % and about 35 wt. % monovinyl arenehydrogenated diene block copolymer, at least a portion of which is sulfonated (to produce the requisite ion exchange capacity). Bipolar membranes comprising these cation exchange materials (which is the subject of application U.S. Ser. No. 869,555 filed June 2, 1986 to Chlanda et al., now U.S. Pat. No. 4,738,764 commonly assigned) exhibit excellent electrical properties and enhanced mechanical properties.

It should be understood that bipolar membranes of the present invention may consist of multiple anion and/or cation exchange layers which may further improve the permselectivity of the membranes. Moreover, although the mechanical properties herein described are quite good, it is possible to add reinforcing materials such as polyethylene, polypropylene or polytetrafluoroethylene screens or glass mats to the membranes without significantly effecting the electrical and mechanical properties thereof.

The anion layers of the bipolar membranes are most preferably formed by the reaction of a styrene-vinyl benzyl chloride copolymer, P(S-VBC), in a solvent with at least two diamines. The diamines and copolymer begin to react immediately upon mixing according to Equation 1 which is shown for one of the most preferred diamines, N,N-dimethyl-1,3-propanediamine (DMPDA)

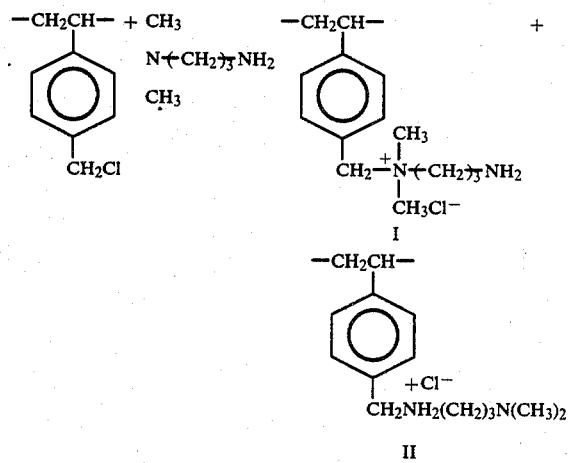

(Although the VBC units are shown as being all para, in reality they are generally present as a mixture of para and meta isomers). Crosslinking occurs when either I or II react with another VBC unit to form III as indicated in Equation 2 below:

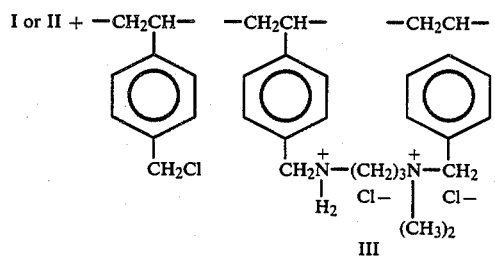

The net result of the reaction of the proper diamines with the P(S-VBC) is the formation of quaternary amine groups which form the charged matrix of the anion layer and crosslinking through structures like III, and the introduction of weakly basic groups (non-quaternary). After the diamines and copolymer are mixed, the mixture (which most preferably exists as a solution) remains fluid for several minutes. The time to gellation depends on the copolymer solvent employed, temperature, concentration and nature of the diamines in the reactions, and on the concentration, molecular weight and vinylbenzyl halide content of the copolymer.

Any suitable solvent may be employed to dissolve the copolymer. Although, most preferably, the solvent is one which will totally dissolve the polymer to form a solution, a mixture of a fine dispersion of the copolymer in the solvent is quite acceptable for producing membranes in the present invention. Preferred solvents include N,N-dimethylformamide (DMF), dimethyl sulfoxide (DMSO), and diglyme, with DMF being a particularly effective solvent for VBC-containing copolymers.

When poly(styrene-vinylbenzyl chloride) copolymer is employed to form a bipolar membrane of the present invention, the concentration of copolymer in the solvent generally ranges from between about 10 wt.% to about 30 wt.%. However, higher or lower amounts may be employed without significantly adversely affecting the properties of the resulting membrane.

The molecular weight of the copolymer will affect the formation of the gel, but does not affect the properties of the membrane. Generally, the higher the molecular weight of the copolymer, the more quickly the material gels.

The concentration of the vinylbenzyl halide in the copolymer has been discussed above. Reiterating, the concentration of the vinylbenzene halide in the copolymer should be in the range of about 18 wt. % to about 60 wt. %, with 30 wt. % to about 45 wt. % of vinylbenzyl halide being most preferred.

As disclosed above, a critical factor in the formation of bipolar membranes of the present invention is the inclusion of the quaternary and non-quaternary amine groups in the interface region. Accomplishing this feature in the preferred process described herein requires the presence of sufficient amine in the anion layer to make available to the interfacial layer a significant number of amine groups to produce the requisite composition of the interfacial layers. When a coating comprising the ion exchange resin and the polymer is applied onto the anion exchange layer, the concentration of amine must be sufficient to react with the polymer applied to the layer to introduce quaternary and non-quaternary amine groups. The concentration of the diamines is generally indicated by the amine ratio; i.e., the moles of diamine to benzylhalide groups in the polymer. For membranes produced by the preferred process of the present invention, the amine ratio is between about 1:1 and about 4:1, with a ratio of at least about 1.2:1 being the preferred lower limit.

We have also discovered that certain mixed diamines in a limited weight ratio are particularly effective in producing the required quaternary and weakly basic groups in the interfacial layer of the dipolar membrane. The mixed amines comprise N,N-dimethyl-1,3-propanediame (DMPDA) and N,N,N'N'-tetramethyl-1,6-hexanediamine (TMHMDA). The mole ratio of these diamines is between about 1:2 and about 5:1 (DMPDA:TMHMDA). To produce the requisite composition of the anion and interfacial layers by the above described casting process, the most preferred mole ratio is between about 1:1 and about 5:1.

Typically, the solution which forms the anion layer gels in about 2 to 5 minutes. Before it gels, it is spread into a layer on a substrate such as glass. The layer is allowed to gel prior to heating, curing and subsequent coating step in order to stabilize the layer thickness. Thereafter, the layer is heated at a temperature of between about 80° C. and about 150° C. for a period of between about 4 minutes and about 20 minutes. This heating step allows the reaction of the vinylbenzyl halide and diamines to proceed more or less to completion and removes most of the solvent from the layer.

The anion exchange layer produced in accordance with the above described procedures exhibits a strong base ion exchange capacity of between about 1 meq/g and about 2 meq/g (Cl-form) and a swelling in water (Cl-form) of between about 20% and about 50%.

To form a bipolar membrane, a suspension of cation exchange resin in a polymer solution is then applied to the surface of the anion layer. This is conveniently done using a doctor blade to spread the resin-polymer mixture into a uniform coating on the anion layer.

As described heretofor, the cation exchange resin has an extremely small particle size and comprises a copolymer of styrene and divinyl benzene. The copolymer is chlorosulfonated and hydrolyzed to yield a crosslinked product (ion exchange resin) having an ion exchange capacity of between about 3 meq/g and about 5 meq/g. Typically, the cation exchange resin is prepared by copolymerizing styrene and divinyl benzene in emulsion to obtain the very small particles. The particles are then chlorosulfonated and following hydrolysis are dispersed in a solvent such as DMF. Other methods of forming the cation exchange resin will be apparent to those of ordinary skill such as, for example, substituting triisopropenyl benzene for divinyl benzene.

The cation exchange resin is then mixed with copolymer in a solvent to form the mixture from which the cation exchange layer and/or interfacial layer is (are) formed. The mixture ordinarily contains between about 8 wt. % and about 25 wt. % resin and copolymer in a solvent such as DMF.

Whether the layer functions as the interfacial layer or as the interfacial and cation exchange layers depends upon the composition of the anion exchange layer, the composition and thickness of the coating layer, and the curing time and temperature of the coating layer. The composition of the anion layer and the coating layer have been fully described above. Thickness of the coating layer is variable. Generally, the dried thickness will range from about 0.01 mil ($0.25 \times 10^{-3}$mm) to several mils. Ordinarily, the coating layer is heated to a temperature between about 80° C. and about 150° C. for a time sufficient to remove substantially all of the solvent from the layer and allow for the reaction of amine with benzyl halide groups. The time at temperature usually ranges from about 1 minute to about 20 minutes. Usually, a coating layer less than about 1 mil, ordinarily on the order of 0.5 mil functions primarily as the interfacial layer. Accordingly, at a dried thickness of less than about 1 mil, it is preferred to apply an additional layer having cation exchange capacity.

The application of a second coating layer having cation exchange capacity insures high permselectivity on the cation side of the bipolar membrane, especially when the first coating is thin. Most preferably, the second coating layer comprises a matrix material which is inert to amine. We have discovered that the ion exchange capacity of the second coating layer should be between 1.0 meq/g and 1.6 meq/g, with an ion exchange capacity of between about 1.3 meq/g and about 1.6 meq/g being particularly effective at producing exceptional bipolar membranes. While any suitable material having the above noted characteristics can be employed as the second coating layer, the most preferred composition of the layer is the materials described in applicant's copending application U.S. Ser. No. 869,555, filed June 2, 1986 to Chlanda et al., commonly assigned, now U.S. Pat. No. 4,738,764. Briefly, the most preferred coating layer comprises at least partially sulfonated polystyrene and at least partially sulfonated monovinyl arene-hydrogenated diene block copolymer, wherein the weight percent of copolymer in the layer is between about 10 wt. % and about 35 wt. %.

Bipolar membranes of the present invention exhibit all of the characteristics required for long-term stability. Moreover, membranes of the present invention exhibit a voltage drop of a less than 1.2 volts at a current density of 109 mA/cm$^2$ in 0.5 M $Na_2SO_4$ at about 30° C. The voltage drop of the bipolar membrane of the present invention is measured by the following procedure. A cell consisting of a bipolar membrane of the present invention interposed between two Nafion © 110 cation exchange membranes and four separators to form a four-compartment cell which is placed between two electrodes. The bipolar membrane is arranged such that the cation face of the bipolar membrane is toward the negative electrode of the power source. Exposed area of the bipolar membrane is 11 cm$^2$. In this test, all compartments of the cell are charged with 0.5 molar $Na_2SO_4$. The temperature is maintained constant at about 30° C. In each compartment formed in part by one side of the bipolar membrane being tested is inserted a salt bridge. Each salt bridge in connected externally to calomel electrodes and a high impedance voltmeter. The voltage between the electrodes at several current levels is recorded. The membrane is then removed and the voltage across the solution in the combined compartment is measured at different current levels. The difference between the voltage across the calomel electrodes with the bipolar membrane and the voltage across the electrodes without the membrane is the potential drop of the membrane.

Having described the invention in sufficient detail to enable one of ordinary skill to make and use the same, the following examples are provided to illustrate the scope of the invention but are not intended to limit the scope of the invention to anything less than is defined by the appended claims.

EXAMPLE 1

A bipolar membrane was produced by the following typical process. 9.23g of a 15% solution of styrene-vinylbenzyl chloride copolymer having a vinylbenzyl chloride content of 35 wt. % was mixed with 0.76 g of a mixture of 3 moles of N,N-dimethylpropanediamine and 1 mole of N,N,N'N'-tetramethylhexamethylene diamine. After mixing, the solution was poured on a glass plate and cast with a doctor blade set at 25 mils (0.64 mm). The cast solution was allowed to stand at room temperature for 5 minutes during which time a gel formed. The plate and gel were placed in a forced draft oven at 125° for 8 minutes, removed and coated without cooling with a portion of a mixture formed by mixing 2.13g of the above styrene-vinylbenzyl chloride solution with 3.07 g of a 10.4% by weight dispersion of cation microgel resin in N,N-dimethylformamide (which may be prepared by the method of Example 1 of U.S. Pat. No. 4,116,889), using a doctor blade set to 1 mil. The membrane was placed back in the oven for 3 minutes then removed and coated with a 25% solution of sulfonated polystyrene-Kraton G © having an ion exchange capacity of 1.35 meq/g using a doctor blade set at 8 mils. The membrane was placed back in the oven for 4 minutes then removed. After cooling, the plate was placed in 10% NaCl solution and after several minutes the membrane was pulled free of the plate. The potential drop was was found to be 1.02 volts at 100 A/ft$^2$ (109 mA/cm$^2$) in 0.5 M $Na_2SO_4$ at 30°.

EXAMPLE 2

Preparation of The Cation Microgel Resin for $C_1$ & $C_2$ 1200 mL $H_2O$ is placed in a 2L 3-neck flask in a constant temperature bath at 60°. The $H_2O$ is degassed with $N_2$ for 1 hour. 18 g sodium lauryl sulfate is added and stirred to dissolve, then 3.0 g $K_2S_2O_8$ is added. After 5 minutes, 210 g distilled styrene and 120 g divinylbenzene (untreated) is added. Polymerization is carried out at 60° (an exotherm to 63° occurred after 1 hour) for 19 hours. The polymerization mixture is added to 5l of 10% NaCl and filtered, then washed 2 times with 3L of $H_2O$. The polymer is then washed 2 times with 3L portions of methanol and is collected by filtration, then dried at 60° to yield 300 g of polymer.

60 g of P(S-DVB) as above is suspended in 600 mL of DCE (1,2-dichlorethane) in a blender. The DCE/copolymer suspension is added to 240 mL of chlorosulfonic acid in 360 mL of DCE with stirring. Addition is made over a period of 10 minutes. The reaction is continued 1 hour after The addition is complete. The reaction mixture is poured into 3L of crushed ice. The product is collected by filtration, suspended in 4.5L of $H_2O$ and boiled until free of DCE. The slurry is filtered to collect the resin. The resin is suspended in 3L of $H_2O$ and again collected by filtration. The cake is dispersed in 900 mL DMF and water is distilled off under vacuum (50 mm). After standing for 24 hours, the supernatent is decanted from any settled material. The supernatent is 10% slurry of resin in DMF.

EXAMPLE 3

A bipolar membrane was produced by the following procedure. 11.92 g of a 15% solution of a styrene-vinylbenzyl chloride copolymer having a vinylbenzyl chloride content of 35 wt. % was mixed with 0.98 g of a mixture of 3 moles of N,N-dimethyl-1,3-propane diamine and 1 mole of N,N,N'N''' tetramethyl-1,6-hexamethylene diamine. After mixing, the solution was poured on a glass plate and spread, with a doctor blade, to a thickness of 25 mil (0.64 mm). The cast solution was allowed to stand at room temperature for 5 minutes. Thereafter, the plate with the cast layer was placed in an oven at 125° C. for 8 minutes. Thereafter, a mixture of 7.74 g of a polystyrene-isoprene-vinylbenzyl chloride terpolymer (30 wt. % vinylbenzyl chloride, 12 wt. % isoprene) with 11.07 g of a 10.5 wt. % dispersion of cation microgel in N,N-dimethylformamide (produced, for example, by the process of Example 2) was coated, using a doctor blade onto the first layer. The layer was cast to a thickness of 5 mils. The layers were then placed in an oven for 3 minutes at 125° C. The layers were then coated with a mixture of 10.92 g of a 10 wt. % high molecular weight polyvinyl chloride solution with 3.48 g of an 11 wt. % dispersion of cation microgel resin in dimethylformamide to a thickness of 8 mil. The three layer membrane was then placed in an oven for four minutes at 125° C. and thereafter removed. After cooling, the plate was placed in 10 wt. % NaCl solution and after several minutes the membrane was pulled free from the plate. Potential drop of the membrane was found to be 0.99 volts at 100 A/ft² (109 mA /cm²) and 0.5 M Na₂SO₄ at 30° C.

EXAMPLE 4

A bipolar membrane was produced in accordance with the following procedure. 8.83 g of a 15wt. % solution of styrene-vinylbenzyl chloride copolymer having a vinylbenzyl chloride content of 35 wt. % was mixed with 0.73 g of a mixture of 3 moles of N,N-dimethylpropane diamine and 1 mole of N,N,N',N'-tetramethy-1,6-lhexane diamine. After mixing, the solution was poured onto a glass plate and cast with a doctor blade set to a thickness of 25 mils. (0.64 mm). The cast solution was allowed to stand at room temperature for 5 minutes. The cast layer and plate were then placed in an oven at 125° C. for 8 minutes and thereafter removed. The layer was then brush coated with a portion of a mixture formed by mixing 1.90 g of a terpolymer of styrene, 15 wt. % divinylbenzene and 50 wt. % vinylbenzyl chloride with an 11 wt. % solution of cation resin in DMF, and a 10 wt. % solution of high molecular weight polyvinyl chloride. The two layered system was then placed in an oven at 125° C. for 3 minutes and thereafter removed. Onto this 2-layered system, a third layer comprising 9.67 g of a 10% solution of high molecular weight polyvinyl chloride and 3.07 g of an 11 wt. % dispersion of cation exchange resin in dimethylformamide was blade coated. The three layered system was then placed in an oven at 125° C. for 4 minutes and thereafter removed. The cooled membrane was then tested in 0.5 molar Na₂SO₄ at 30° C., exhibiting a voltage drop of 1.16 volts at 100 amp/ft.² (109 mA/cm²).

EXAMPLE 5

Sulfonation Reaction

Into a 2L three-necked round bottom flask fitted with a mechanical stirrer was charged 475 g of 7.5 wt. % Kraton © G solution in dichlorethane (DCE) and 1175 g of 15 wt. % polystyrene in DCE. The mixture was stirred for a time in a water bath maintained at about 50° C. 75 mL acetic anhydride was added by pipette over a period of about 10 minutes thereafter, 40 g of 98 wt. % sulfuric acid was added dropwise by a funnel over a period of about 10 minutes the reactants were maintained at 50° C. for 3 hours the reaction mixture was transferred to a 3L beaker. 125 mL of methanol and 1 1 of DMF were added to the reaction mixture. The DCE was then removed from the reaction mixture using a rotating evaporator, leaving a viscous solution of sulfonated polymer in DMF.

A portion of the sulfonated polymer was then cast 25 mil (0.64 mm) thick (×25.4 cm wide×50.8 cm long) onto a glass sheet. The casting was dried at 100° C. for 10 minutes and soaked free of the plate in water. The sheet was reacted with 4 1 of 0.1 M NaOH for 4 hours., then with water for an additional 4 hours. The film, now in the sodium salt form, was dried in an oven overnight at 90° C. 10 g of the film was then dissolved in 30 g DMF to give a 25% solution used to produce the bipolar membrane described in Examples 6 and 7 below.

EXAMPLE 6

A bipolar membrane was produced by the following procedure.

The anion layer of the bipolar membrane was formed by mixing 10.075 g poly(styrene- 35 wt. % vinylbenzyl chloride) copolymer [P(S-VBC(35)] in dimethylformamide (DMF) to form a 15 wt. % solution to which was added 0.83 g of 3:1 molar ratio N,N-dimethyl-1,3-propanediamine (DMPDA) to N,N,N',N'-tetramethyl-1,6-hexanediamine (TMHMDA). The mixed amine-containing solution was spread onto a substrate to a thickness of about 25 mils. The cast solution was held at room temperature for about 30 minutes and then dried in an oven at 125° C. for about 8 minutes to form an anion exchange layer. The anion exchange layer was then brush coated with a mixture of 2.069 g P(S-VBC35) in DMF and 3.041 g of a 10.2 wt. % suspension of cation exchange resin in DMF. The mixture was brush coated onto the anion exchange layer and thereafter heated in an oven at 125° C. for about 3 minutes to form a second layer. Thereafter, a mixture of 6.583 g of partially sulfonated polystyrene and hydrogenated styrene butadiene block copolymer (Shell, Kraton © G 1652 described in Kraton © thermoplastic rubber, by the Shell Chemical Co. in publication SC:68–82 as being a styrene-ethylene-butylene-stryene block copolymer tested according to the ASTM D412 tensile test at a jaw separation speed of 10 in/min, to have a tensile strength of 4,500 psi, and 300% modulus of 700 psi, elongation of 500%; Shore A hardness of 75, a specific gravity of 0.91, a Brookfield viscosity of 550 cps in a 25% by wt of polymer in a toluene; and a styrene to rubber ratio of 29:71. in the sodium salt form in DMF at a concentration of 25 % was formed (see Example 4). A portion of the mixture was cast on the second layer to a thickness of 8 mil and was then heated for about 4 minutes at 125° C. Thereafter, an additional layer was formed by casting a second portion of the mixture to a thickness of 8 mil and thereafter heating the cast mixture for about 4 minutes at 125° C. The bipolar membrane produced by this procedure exhibited a voltage drop of 1.03 volts at 109 ma/cm² (100 A/ft²) and an efficiency in 2 M NaCl of 87.4%.

EXAMPLE 7

A bipolar membrane was prepared by the following procedure. An anion exchange layer was formed by mixing 12.01 g of 15 wt.% P(S-VBC35) in DMF with 0.99 g of 3:1 molar ratio of DMPDA to TMHMDA. The mixture was spread on a glass plate to a thickness of 25 mil, kept at room temperature for about 30 minutes, and then heated at 125° C. for about 8 minutes. The resultant anion exchange layer was then brush coated with a 1:1 weight ratio of P(S-VBC) and cation microgel resin. Thereafter, two layers consisting of partially sulfonated polystyrene-Kraton © G copolymer having an anion exchange capacity of about 1.35 meq/g were coated each to a thickness of 8 mils and each followed by heating at about 4 minutes at 25° C. The bipolar membrane produced by this procedure exhibited a voltage drop of 1.06 V at 109 ma/cm² (100 A/ft²). Mechanically, the membrane was very strong and not brittle.

EXAMPLE 8

Pereparation of Bromomethylated Polysulfone

A 200 mL single-necked round-bottomed flask fitted with a condenser was charged with 70 mL of trichloroethylene (TCE) followed by 4.0 g of polysulfone (Amoco Udel P-1800) described in Udel ® Polysulfone, Engineering Polymers Product Data, by Union Carbide published as F-42072J in 9/84, as P-1700 (which is the same as P-1800 but in pellet form rather than powder form) as polysulfone having a melt flow of 6.5 g/10 minutes, at 650° F. (343.3° C.), 44 psi (0.30 MPa) according to ASTM D1238, a density of 1.24 Mg/m$^3$ (ASTM D1505), and a ASTM D638 tensile strength at yield of 10,200 psi (70.3 MPa), tensile modulus $3.6 \times 10^5$ psi ($2.482 \times 10^3$ MPa) and tensile elongation at break of 50-100%. The mixture was stirred at ambient temperature until the polymer had dissolved, then 9.0 mL of bromoethyloctyl ether in 5 mL of TCE were added. The solution was warmed to 80° C. and held at that temperature for 24 hours. The polymer was precipitated from the red-brown solution by filtration. The polymer was redissolved in chloroform and reprecipitated into methanol then collected by filtration and dried under vacuum at room temperature overnight to yield 4.7 g of bromomethylated polymer. The H-NMR of The material indicated that there were 1.15 —$CH_2Br$ groups/-repeat unit corresponding to halobenzyl content of 2.1 meq/g.

Bipolar Membrane Preparation

To 10.00 g of a 15% by wt. solution of poly(styrene vinylbenzyl chloride) having a vinylbenzyl chloride content of 35 wt. % was added 0.82 g of a mixture of 3 moles of N,N-dimethyl-1,3-propane diamine and 1 mole of N,N,N N'N'-tetramethyl-1,6-hexane diamine. After mixing for 30 seconds the solution was poured on a glass plate and spread with a doctor blade set at 25 mils (0.64 mm). The solution gelled on the plate and after 5 minutes was placed in an oven at 125° C. for 8 minutes. The anion layer was removed and coated with a portion of a mixture of 2.50 g of a 15 wt. % solution of the above polymer in DMF with 3.75 g of a 10.0 wt. % dispersion of cation resin in DMF using a knife set to 1 mil. The coated membrane was heated in the oven for an additional 3 minutes then coated with a 25 wt. % solution of cation exchange polymer (prepared, for example, by the method of Example 2) having an ion exchange capacity of 1.47 meg/g using a doctor blade set to 10 mils. The coated membrane was heated an additional 4 minutes in the oven, cooled and soaked free of the plate in 10% NaCl solution. The potential drop of the membrane in 0.5 M $Na_2SO_4$ at 30° C. was 1.02 volts at 109 MA/cm$^2$.

We claim:

1. A bipolar membrane comprising:
   (a) a first layer comprising the reaction product of a polymer containing between about 1.2 meq/g and of about 3.9 meq/g benzyl halide and amine having tertiary and non-tertiary amine groups, the reaction product comprising quaternary amine groups derived from halomethyl groups of the polymer in the first layer;
   (b) a second layer comprising the reaction product of a matrix polymer containing between about 2.0 meq/g and about 3.9 meq/g benzyl halide and amine having tertiary and non-tertiary amine groups, the reaction product comprising quaternary amine groups and non-quaternary amine groups derived from halomethyl groups of the polymer in the second layer, and the matrix polymer having dispersed therein cross-linked cation exchange resin having an ion exchange capacity of between about 3 meq/g and about 5 meq/g, the amount of quaternary and non-quaternary amine groups in the second layer being sufficient so that the bipolar membrane has a potential drop of less than 1.2 volts at 109 mA/cm$^2$ in 0.5 M $Na_2SO_4$ at about 30° C.; and
   (c) a third layer having a cation exchange capacity of between about 1.0 meq/g and about 1.6 meg/g.

2. A bipolar membrane comprising:
   (a) an anion permselective layer having an ion exchange capacity of between about 1 meq/g and about 2 meq/g and containing quaternary amine groups;
   (b) an interfacial layer having an ion exchange capacity of between about 1 meq/g and about 3 meq/g for Na$^+$, the interfacial layer having a matrix polymer having dispersed therein cation exchange resin and containing quaternary amine groups and non-quaternary amine groups, the amount of quaternary and nonquaternary amine groups in the interfacial layer being sufficient so that the bipolar membrane has a potential drop of less than 1.2 volts at 109 mA/cm$^2$ in 0.5 M $Na_2SO_4$ at about 30° C.; and
   (c) a cation perselective layer having an ion exchange capacity of between about 1.3 meq/g and about 1.6 meq/g.

3. A bipolar membrane comprising and anion permselective proton, a cation perselective proton and a region therebetween comprising a matrix material comprising the reaction product of a matrix polymer containing between about 30 wt % and about 60 wt % vinylbenzyl halide and amine having tertiary and nontertiary amine groups, which matrix material includes quaternary and non-quaternary amine groups derived from halomethyl groups of the polymer, and an ion exchange resin having a charge opposite the charge of the quaternary amine groups, the amount of quaternary and nonquaternary amine groups in the region being sufficient so that the bipolar membrane has a potential drop of less than 1.2 volts at 109 mA/cm$^2$ in 0.5 M $Na_2SO_4$ at about 30° C.

4. A bipolar membrane comprising:
   (a) an anion permselective layer comprising a crosslinked reaction production of vinylbenzyl halide containing copolymer containing between about 18 wt % and about 60 wt % vinylbenzyl halide and amine having tertiary and non-tertiary amine groups, the crosslinked reaction product comprising quaternary amine groups, the anion perselective layer being essentially free of cation exchange resin;
   (b) an interfacial layer comprising
     (i) crosslinked reaction product of a matrix vinylbenzyl halide containing copolymer containing between about 30 wt % vinylbenzyl halide with amine having tertiary and non-tertiary amine groups, the reaction product including quaternary and non-quaternary amine groups, the amount of quaternary and non-quaternary amine groups in the interfacial layer being sufficient so that the bipolar membrane has a potential drop of less than 1.2 volts at 109 mA/cm$^2$ in 0.5 M $Na_2SO_4$ at about 30° C.; and
     (ii) cation exchange resin dispersed in the matrix crosslinked reaction product; and
   (c) a cation permselective layer being essentially free of amine groups.

5. The bipolar membrane of claim 1 wherein the reaction product of element (a) is crosslinked.

6. The bipolar membrane of claim 1 wherein the benzyl halide copolymer of elements (a) and (b) is poly(styrene-vinylbenzyl halide) copolymer and wherein the first layer has an anion exchange capacity of between about 1 meq/g and about 2 meq/g.

7. The bipolar membrane of claim 2 wherein the degree of swelling in water is between about 20% and about 50%.

8. The bipolar membrane of claim 5 wherein the cation exchange resin comprises divinylbenzene.

9. The bipolar membrane of claim 8 wherein the amount of divinylbenzene in the resin is at least about 30 wt %.

10. The bipolar membrane of claim 5 wherein the weight ratio of cation exchange resin to copolymer in the interfacial layer is between about 1:2 and about 2:1.

11. The bipolar membrane of claim 5 wherein the amount of vinylbenzyl halide in the copolymer from which the anion permselective layer derived is between about 30 wt % and about 45 wt %.

12. A bipolar membrane comprising an anion exchange layer, a cation exchange layer and an interfacial layer comprising a matrix polymer having dispersed therein a cation exchange resin and said matrix polymer also containing a sufficient amount of quaternary and non-quaternary amine groups so that the bipolar membrane has a potential drop of less than 1.2 volts at 109 mA/cm$^2$ in 0.5 M Na$_2$SO$_4$ at about 30° C.

13. A process for forming bipolar membranes comprising the steps of:

(a) forming a first layer comprising a polymer having chemically reactive sites, the polymer having amine groups affixed thereto by the reaction of a precursor polymer with mixed amines comprising N,N-dimethy-1,3-propanediamine and N,N,N',N'-tetramethyl-1,6-hexane diamine in a molar ratio of between about 1:2 and about 5:1;

(b) forming on the first layer a second layer comprising a polymer having quaternary and non-quaternary amine groups affixed thereto, and a cation exchange resin dispersed in the polymer of the second layer, the amount of quaternary and non-quaternary amine groups in the second layer being sufficient so that the bipolar membrane has a potential drop of less than 1.2 volts at 109 mA/cm$^2$ in 0.5 M Na$_2$SO$_4$ at about 30° C.; and, (c) forming a third layer on said second layer, the third layer being a cation perselective layer.

14. The process of claim 13 wherein the second layer further comprises non-quaternary amine groups attached to the polymer in the second layer.

15. The process of claim 13 wherein the ratio of moles of diamine to moles of halomethyl group used to form the first layer is between about 1.2:1 to about 4:1.

16. The process of claim 13 wherein the weight ratio of cation exchange resin to polymer in the second layer is between about 1:2 and about 2:1.

UNITED STATES PATENT AND TRADEMARK OFFICE
CERTIFICATE OF CORRECTION

PATENT NO. : 4,766,161
DATED : August 23, 1988
INVENTOR(S) : Frederick P. Chlanda & Ming J. Lan It is certified that error appears in the above-identified patent and that said Letters Patent is hereby corrected as shown below:

Col. 5, line 55: "exhibis" should read -- exhibits --.

Col. 12, line 28: "25%" should read -- 25 wt.% --.

Col. 12, line 53: "25°" should read --- 125° ---.

Col. 12, line 59: "Pereparation" should read -- Preparation --.

Col. 13, line 23: "N,N,N N'N'" should read -- N,N,N',N' --.

Col. 13, line 36: "meg/g" should read -- meq/g --.

Col. 13, line 40: "109 MA/cm$^2$" should read -- 109 mA/cm$^2$ --

Col. 14, line 19: "and" should read -- an --.

Signed and Sealed this

Third Day of October, 1989

Attest:

DONALD J. QUIGG

Attesting Officer  Commissioner of Patents and Trademarks